United States Patent [19]

Ohga et al.

[11] Patent Number: 5,317,553
[45] Date of Patent: May 31, 1994

[54] OPTICAL DISC RECORDING AND/OR REPRODUCING APPARATUS HAVING A BUFFER MEMORY TO ACCOMMODATE TRACK JUMPS

[75] Inventors: Norio Ohga, Tokyo; Katsuaki Tsurushima; Tadao Yoshida, both of Kanagawa, all of Japan

[73] Assignee: Sony Corporation, Tokyo, Japan

[21] Appl. No.: 745,486

[22] Filed: Aug. 15, 1991

[30] Foreign Application Priority Data

Aug. 23, 1990 [JP] Japan .................. 2-221725

[51] Int. Cl.⁵ .......................... G11B 7/00; G11B 20/10
[52] U.S. Cl. .................................. 369/54; 369/59; 369/124; 369/275.4
[58] Field of Search .............. 369/275.3, 275.4, 44.26, 369/47, 48, 54, 58, 59, 13, 32, 109, 111, 124, 288, 289, 292; 360/114, 19.1, 36.1, 59, 10.1, 10.3, 9.1, 8; 358/341, 342, 343

[56] References Cited

U.S. PATENT DOCUMENTS

| | | | |
|---|---|---|---|
| 4,481,620 | 11/1984 | Murakami | 369/275.4 |
| 4,733,385 | 3/1988 | Henmi et al. | 369/13 |
| 4,736,352 | 4/1988 | Satoh et al. | 369/32 |
| 4,763,208 | 8/1988 | Kawamura et al. | 360/10.1 |
| 4,805,046 | 2/1989 | Kuroki et al. | 360/49 |
| 4,809,087 | 2/1989 | Shimeki et al. | 360/19.1 |
| 4,899,330 | 2/1990 | Einhaus | 369/289 |
| 4,942,565 | 7/1990 | Lagadec | 369/59 |
| 5,099,464 | 3/1992 | Maeda | 369/13 |
| 5,109,369 | 4/1992 | Maeda et al. | 369/50 |
| 5,119,209 | 6/1992 | Okano | 360/10.1 |
| 5,130,816 | 7/1992 | Yoshio | 369/49 |

FOREIGN PATENT DOCUMENTS

0260722A2 3/1988 European Pat. Off. .
0326437A2 8/1989 European Pat. Off. .
0052267 2/1989 Japan .

Primary Examiner—Aristotelis Psitos
Assistant Examiner—Thang V. Tran
Attorney, Agent, or Firm—Philip M. Shaw, Jr.

[57] ABSTRACT

A disc-shaped recording medium and a recording/reproducing apparatus employing the disc-shaped recording medium as a recording medium, are disclosed. The recording medium has a diameter of not more than 80 mm, and a recording track is formed on the recording medium with a track pitch of approximately 1.6 μm. Information in excess of 130 Mbytes is recorded in a data compressed state on the recording track and the recording medium is rotationally driven at a constant linear velocity for recording and optically reproducing the information. The recording/reproducing apparatus employing the disc-shaped recording medium as a recording medium includes a buffer memory between a data compressing circuit for compressing input digital data and a recording encoding circuit for processing the compressed data by modulation suitable for recording, as long as a recording system of the apparatus is concerned, and a buffer memory between a playback decoding circuit for processing the compressed data by error correction decoding and demodulation complementary to the modulation and a data expansion circuit for expanding the compressed data to the original state. By suitably selecting the capacity of the buffer memories, recording and reproduction may continue satisfactorily even if the scanning position of the recording head and the optical head undergoes track jump during recording or reproduction.

7 Claims, 5 Drawing Sheets

OPTICAL DISC RECORDING AND/OR REPRODUCING APPARATUS HAVING A BUFFER MEMORY TO ACCOMMODATE TRACK JUMPS

Background of the Invention

1. Field of the Invention

This invention relates to a disc-shaped recording medium, such as a reproduce-only disc, a once-write disc on which recording may be made only once, or an overwrite disc on which recording may be made repeatedly, and a recording/reproducing apparatus therefor.

2. Description of the Related Art

Currently, an optical disc as a disc-shaped recording medium is classified into three types, namely a reproduce-only type, once-write type and overwrite type, and has a variety of disc diameters and recording capacities.

As one of the features of the optical disc, it has a smaller size and yet is capable of recording and/or reproducing a larger volume of information.

For example, in the case of a compact disc (CD) devoted to reproduction of audio signals, a recording track carrying a train of pits is formed spirally at a track pitch of 1.6 $\mu$m in a 50 to 116 mm diameter region of a disc which is 120 mm in diameter, and 2-channel audio signals continuing for 60 minutes may be recorded on the disc.

With the compact disc, the disc is rotated at a constant linear velocity of 1.2 to 1.4 m/s and the recording track formed thereon is scanned by an optical pickup for detecting the presence or absence of the pits on the disc by taking advantage of the phenomenon of light diffraction for reproducing the recorded signals. During reproduction, in order for the optical pickup to scan the recording track correctly, tracking servo control is performed, in addition to focusing servo control.

Recently, there is presented a small-sized optical disc with a diameter of 80 mm, which, while having the recording specifications and the signal format similar to those of the compact disc, has a playback time shorter than that for the compact disc, that is, a data capacity smaller than that for the compact disc.

There is also presented a car-laden type or portable type reproducing apparatus by taking advantage of the characteristic small size of compact disc. With this type of the reproducing apparatus, means must be provided for combatting against vibrations. More specifically, vibrations may produce track jump, that is skipping of a scanning position of the optical pickup. Should the track jumps occur, the tracking servo control as well as the focusing servo control runs out of order to interrupt playback signals or to produce unnatural or forced playback signals. The conventional practice has been to combat against the vibrations by a mechanically strong vibration-proofing system.

Meanwhile, it is difficult to design a reproducing apparatus employing a disc as a recording medium so as to be of a lesser size than the disc diameter. Since the compact disc has a diameter of 120 mm, the reproducing apparatus cannot be reduced in size beyond a certain limit value, meaning that the apparatus is slightly too large in size to be used as a portable apparatus. In addition, with the portable type apparatus, the strong vibration-proofing system as the measures for combatting against vibrations leads inevitably to an increased size despite the request for size reduction of the apparatus.

Although it may be contemplated to reduce the data capacity or the playback time to reduce the disc size and hence the size of the reproducing apparatus, the merit proper to the portable type apparatus is reduced to half because the playback time is correspondingly reduced.

As a matter of fact, such small-sized portable type apparatus has not been realized up until now.

Object and Summary of the Invention

It is an object of the present invention to provide a disc-shaped recording medium and a recording and/or reproducing apparatus therefor, whereby the size of the apparatus may be reduced without reducing the data volume.

The present invention provides a disc-shaped recording medium having a diameter not larger than 80 mm, wherein a recording track is formed at a track pitch of approximately 1.6 $\mu$m, an information of not less than 130M bytes is recorded on said recording track in a data compressed state, and wherein recording of information signals and/or reproduction of recorded information signals may be achieved in a state of a constant linear velocity.

A recording apparatus employing the disc-shaped recording medium as a recording medium comprises a disc driving unit for rotationally driving the disc-shaped recording medium at a constant linear velocity, data compression means for data-compressing an input digital information, recording encoding circuit for processing compressed data from the data compression means by error correction encoding and predetermined modulation suited for recording, a recording head for recording encoded data on the disc-shaped recording medium, and a buffer memory provided between the data compression circuit and the recording encoding circuit, said buffer memory having at least a data capacity capable of storing data from the data compression circuit corresponding to a recording time which extends from an occurrence of a track jump of a recording position on the disc-shaped recording medium until resetting of the recording head to a correct track position.

A reproducing apparatus for optically reproducing an information from the disc-shaped recording medium comprises a disc driving unit for rotationally driving the disc-shaped recording medium at a constant linear velocity, an optical head for reading compressed data from the disc-shaped recording medium, an RF circuit for detecting playback signals from an output of the optical head, a playback decoding circuit for processing the playback signals from the RF circuit by error correction decoding and by demodulation complementary to modulation performed during recording, and a buffer memory provided between the playback decoding circuit and the data expansion circuit, said buffer memory having at least a size sufficient to supply data to the data expansion circuit corresponding to a playback time which elapses since the occurrence of a track jump of a playback position on the disc-shaped recording medium until the resetting of the playback position of the optical head to a correct track position.

Although the disc-shaped recording medium is of an extremely small diameter of not more than 80 mm, data are recorded with data compression, such that the information of 130M bytes or more, for example, audio signals continuing for a time longer than 60 minutes, more specifically, for 74 minutes, may be recorded or reproduced.

With the recording apparatus, digital data are recorded on a small-sized disc-shaped recording medium having a diameter of not more than 80 mm with data compression and with error correction code data annexed to the digital data. If a track jump should occur on the disc-shaped recording medium during recording, data readout from the buffer memory is discontinued to perform only data readout from the data compression circuit, and data readout from the buffer memory is restarted after the recording position is reset to a correct position, thereby assuring continuous data recording.

If a track jump should occur during reproduction, data recording into the buffer memory is discontinued and only data readout is performed. Data writing is restarted after correction of the reproducing position so that reproduction may be continued without interruption of playback signals.

DETAILED DESCRIPTION OF PREFERRED EMBODIMENTS

The following are the specifications for a disc-shaped recording medium according to the present invention, referred to hereinafter as a disc.

Figure 1B:
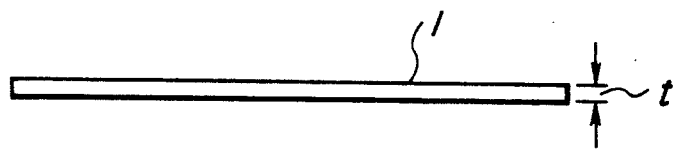
FIG. 1B is a side elevational view showing the disc-shaped recording medium shown in FIG. 1A.
Figure 1A:
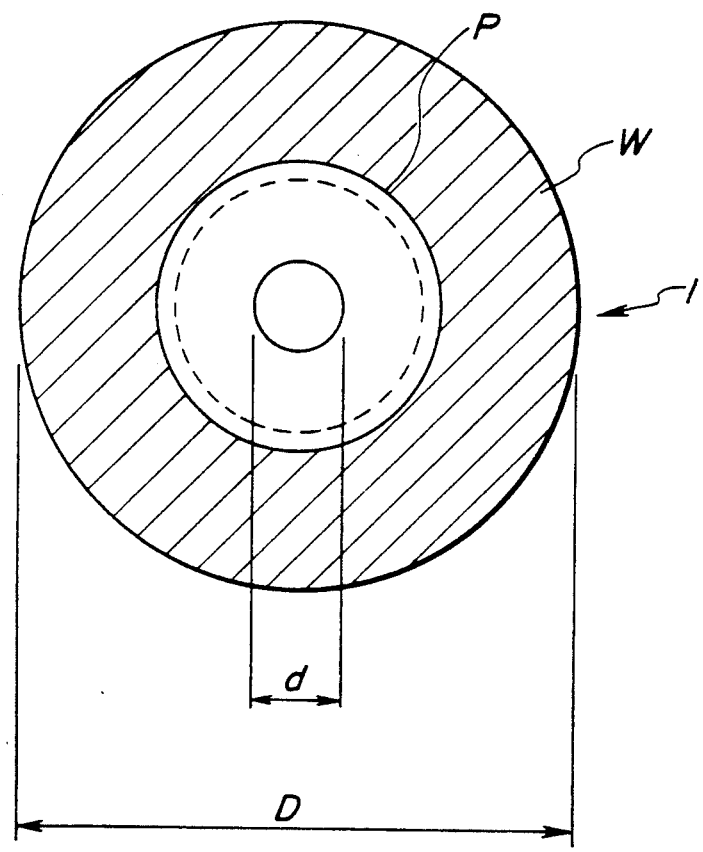
FIG. 1A is a plan view for illustrating the construction of a disc-shaped recording medium according to the present invention.

Referring to FIG. 1A, the disc 1 has an outer diameter D equal to 64 mm, a center hole diameter d equal to 10 mm and a signal recording area W, shown by hatching, of a diameter of 32 mm or more. The disc 1 has a thickness t which, as shown in FIG. 1B, is equal to 1.2 mm.

A recording track is formed spirally on the disc 1 at a track pitch of 1.6 $\mu$m. The disc 1 is driven rotationally at a constant linear velocity of 1.2 to 1.4 m/s.

In the present embodiment, information of 130M bytes or more may be recorded by compression of the information for recording.

For example, when audio signals undergo analog to digital conversion at a sampling frequency of say 44.1 kHz on the 16-bit-per-sample basis, 2-channel audio data of 60 minutes or longer may be recorded and/or reproduced by compressing the digital audio data at a compression rate of e.g. ¼.

For the present embodiment, two different disc types may be contemplated. The present embodiment provides a reproduce-only optical disc, on which signals are recorded by a train of pits produced by injection molding or the like, and an overwrite type magneto-optical disc having a photomagnetic recording layer for recording, reproduction and erasure.

The reproduce-only optical disc includes a transparent disc base plate of polycarbonate or PMMA, on which information signals, herein digital audio signals in the form of a train of pits, have been transferred by injection molding from a pattern of projections and valleys of a stamper consistent with the information signals. A reflecting film of a metal, such as aluminum, is deposited on the surface of the recording layer, such as by vacuum deposition or sputtering, and a protective layer of an UV resin or the like is applied on the reflective layer, such as by spin coating.

The overwritable magneto-optical disc includes a disc base plate of a transparent plastic material, such as polycarbonate or PMMA, on which a photomagnetic recording film (perpendicular magnetization film) of, for example, TbFeCo, is deposited, such as by vacuum deposition or sputtering, and a protective film of, for example, UV resin, is deposited thereon.

It is noted that, in the case of a magneto-optical disc, recording conditions may be prerecorded by a train of pits formed as prepits or prepatterns in a 30–32 mm diameter region of the disc, as shown by a broken line in FIG. 1A, simultaneously with molding of the disc base plate such as by injection molding.

There is also formed on the disc 1 a pregroove for tracking control, that is a pregroove for controlling a light spot irradiated from the optical head on the disc. In the present embodiment, an absolute time code is recorded in the pregroove in superimposition on the wobbling signals for tracking.

In the present embodiment, the disc 1 is accommodated in a disc cartridge to prevent damage to the disc or deposition of dust and dirt on the disc.

The disc cartridge, having accommodated therein a reproduce-only optical disc, is provided with a cartridge proper 2, composed of an upper half and a lower half of synthetic resin or the like. A shutter plate 3 for opening or closing an aperture 2a, adapted for partially exposing a signal recording area W of the disc 1 accommodated within the cartridge proper 2 to outside, is slidably mounted on the cartridge proper 2. This shutter plate 3 is formed in an L-shape by bending a metal plate or a resin plate or injection molding of a synthetic resin material. The proximal end of a shorter side of the shutter plate 3 is bent to conform to the contour of the end face of the cartridge proper 2. The shutter plate is supported at this bent portion by the cartridge proper 2.

Figure 3:
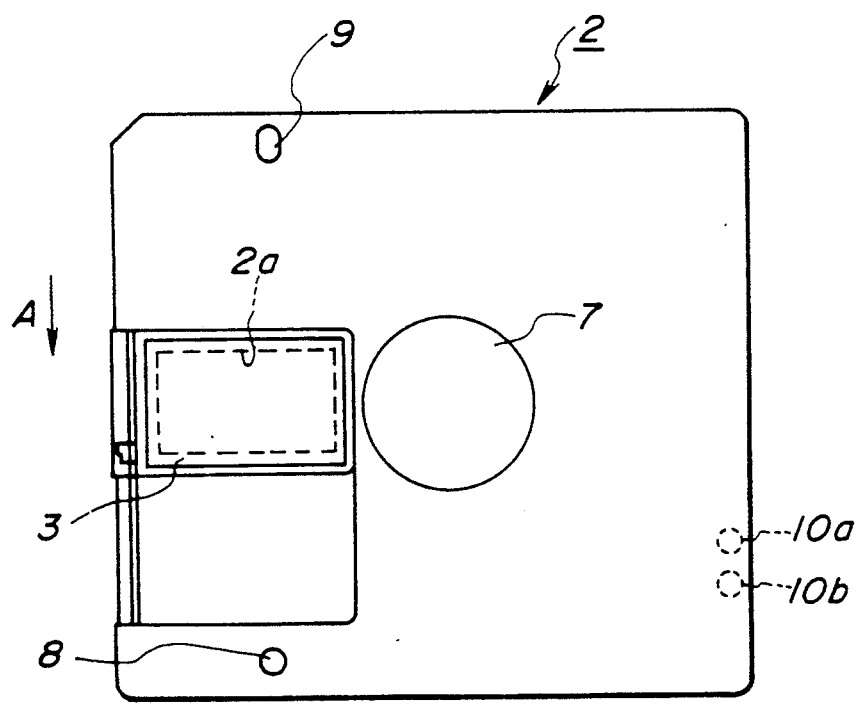
FIG. 3 is a bottom view thereof.

Turning to FIG. 3, the shutter plate 3 is displaced in a direction shown by an arrow A for opening the aperture 2a of the cartridge proper 2 for exposing at least the recording area W of the disc 1 to outside. In other words, with the shutter plate thus moved in the direction shown by arrow A, the optical head and the disc are brought to a position of facing each other. It is noted that, in the present reproduce-only disc, one of the major sides of the disc cartridge is not provided with an aperture by means of which the disc 1 is faced by a magnetic head as later described, but is provided with a rectangular area 4 of a slightly lesser size than the outer contour of the cartridge proper 2 for application of a label etc. for a picture or a legend indicating record contents of the disc 1.

Within the cartridge proper 2, there are provided a locking member 5 for locking the shutter plate 3 when the shutter plate is at a position of closing the aperture 2a formed in the cartridge proper 2, and a shutter reset spring 6 for normally biasing the shutter plate 3 in a direction of closing the aperture 2a.

When the disc cartridge is introduced into the recording/reproducing apparatus via a cartridge inserting opening with the direction shown by an arrow X as the inserting direction, the locking state of the shutter plate 3 by the shutter locking member 5 is released by a shutter opening member provided in the recording/reproducing apparatus. When the locking state of the shutter plate 3 is released, the shutter plate 3 is slid against the bias of the shutter reset spring 6 in the direction of opening the aperture 2a formed in the cartridge proper 2. When the disc cartridge is ejected out of the recording/reproducing apparatus, the shutter plate 3 is slid by the shutter reset spring 6 in the direction of closing the aperture 2a of the cartridge proper 2.

An aperture 7 for intrusion by a disc table of a disc driving unit adapted for rotationally driving the disc is provided at a mid portion of the lower half on the bottom side of the cartridge proper 2. There are also provided positioning holes 8 and 9 on the lower half of the cartridge proper 2 into which positioning pins are intruded and engaged for positioning the disc cartridge loaded onto a recording and/or reproducing section provided within the recording and/or reproducing apparatus.

Figure 4:
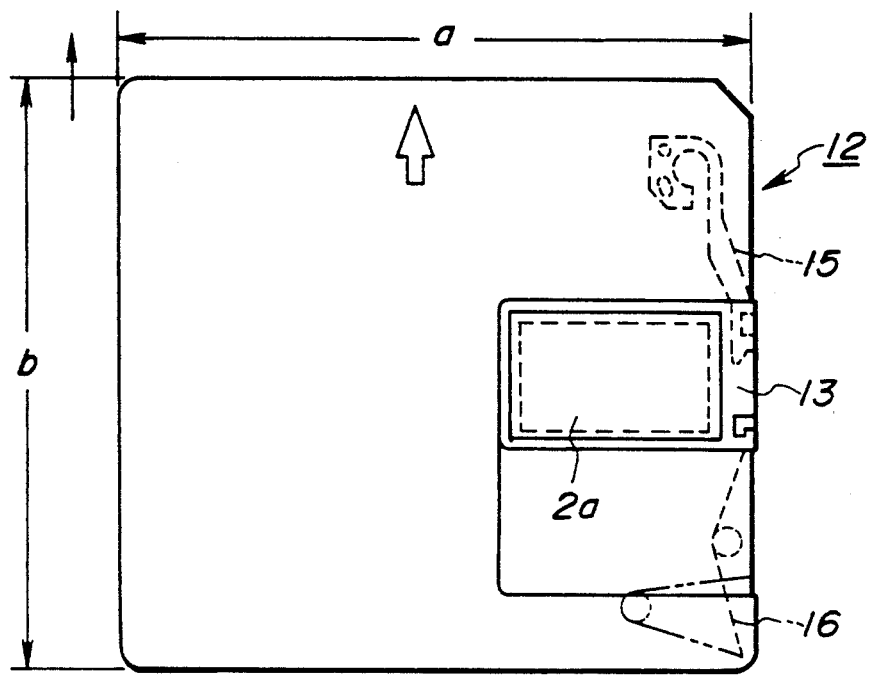
FIG. 4 is a plan view showing a disc cartridge having accommodated therein a magneto-optical disc for recording and reproduction.
Figure 5:
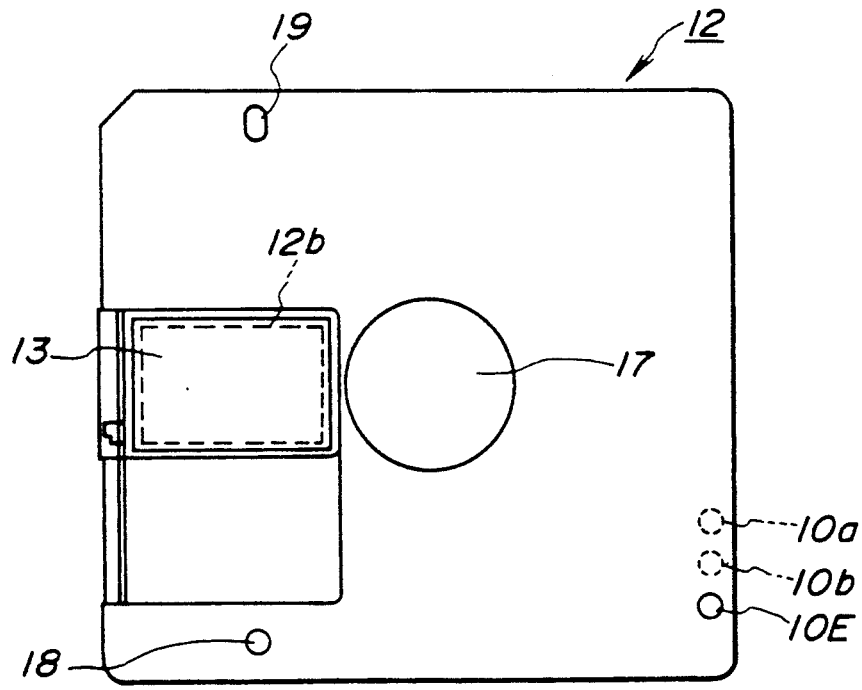
FIG. 5 is a bottom view thereof.

The disc cartridge having accommodated therein a magneto-optical disc enabling overwriting of the information signals is designed as shown in FIGS. 4 and 5. The disc cartridge is provided with a cartridge proper 12 composed of an upper half and a lower half of synthetic resin similarly to the above described disc cartridge having accommodated therein the reproduce-only optical disc. The present disc cartridge is provided with apertures 12a, 12b on its upper and lower sides, respectively, for radially exposing a portion of the signal recording area W of the disc 1 to outside. By these apertures 12a, 12b, the signal recording area W of the disc 1 is exposed to the optical head and to the magnetic head, respectively. Thus, when the shutter plate 13 is slid in the direction of the arrow A in FIG. 5 to open the apertures 12a, 12b, the sides of the disc 1 are exposed to outside by means of these apertures 12a, 12b.

Meanwhile, the shutter plate 13 provided to the present disc cartridge is of a U-shaped cross-section, in distinction from the above described shutter plate for the reproduce-only optical disc. The shutter plate is formed by bending a metal or resin plate or molding a synthetic resin, and is mounted slidably on the front side of the cartridge proper 12.

Figure 2:
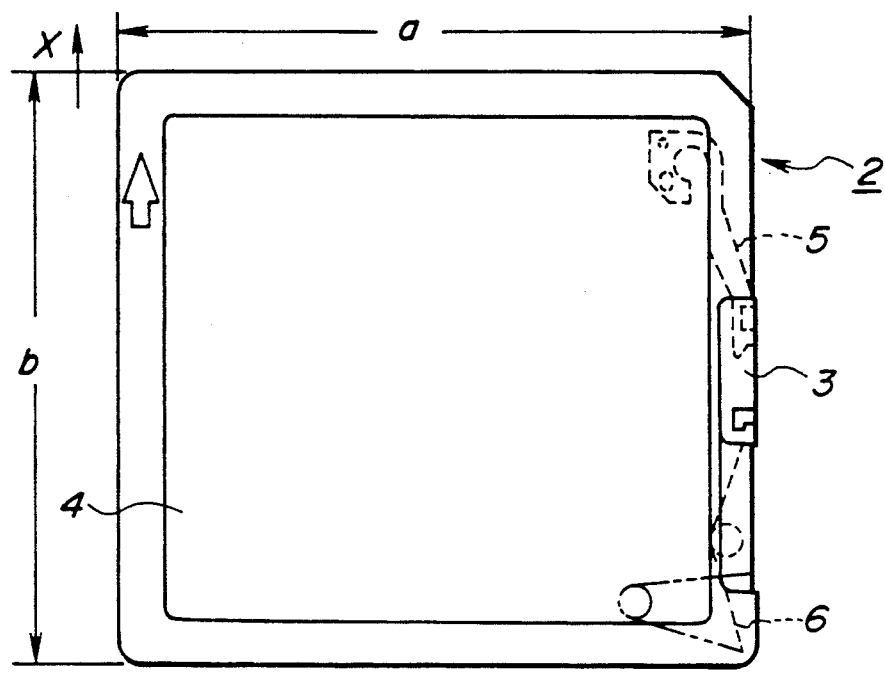
FIG. 2 is a plan view showing a disc cartridge having accommodated therein a reproduce-only optical disc.

The disc cartridge having accommodated therein the reproduce-only optical disc and the disc cartridge having accommodated therein the overwritable magneto-optical disc are both of the same size with a transverse length a equal to 72 mm, a longitudinal length b equal to 68 mm and a thickness equal to 5 mm, as shown in FIGS. 2 and 4.

The lower half on the bottom side of the cartridge 2 or 12 is provided with holes or projections 10a, 10b as means for discriminating whether the disc accommodated therein is a reproduce-only disc or an overwrite type disc, as shown in FIGS. 3 and 5. The bottom side of the disc cartridge 12 is also provided with a hole 10E as mistaken erasure inhibiting means, which may be a slidable mistaken erasure inhibiting pawl such as is used in a floppy disc, or a rupturable tongue such as is used in a compact cassette.

An apparatus for recording or reproducing audio signals on or from the above described disc 1 is hereinafter explained.

Figure 6:
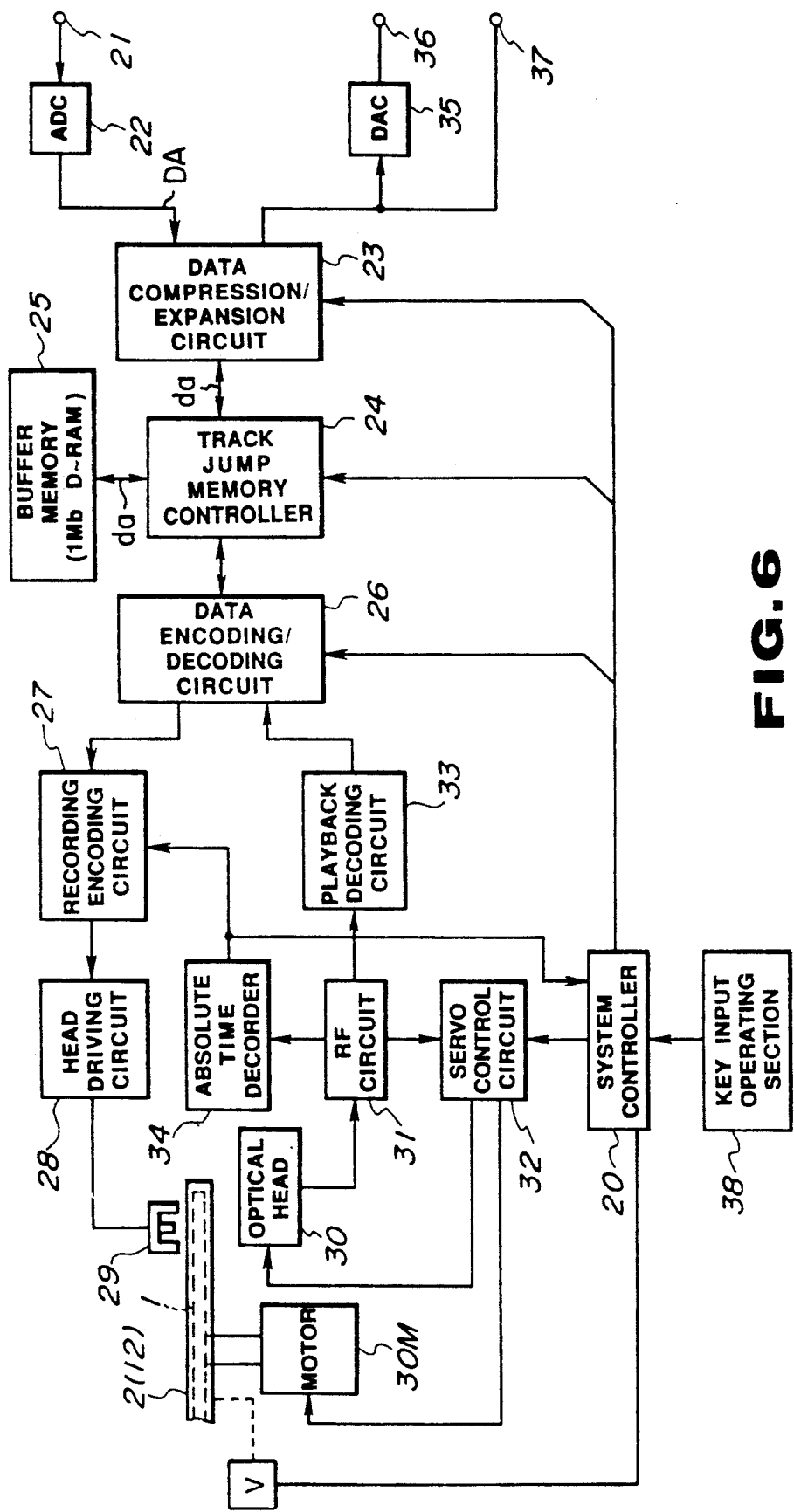
FIG. 6 is a block circuit diagram showing a disc recording and/or reproducing apparatus according to the present invention.

FIG. 6 shows an embodiment of the recording and/or reproducing apparatus which has been exceedingly simplified in structure through utilization of an IC technology.

In the first place, recording on a magneto-optical disc is explained. It is noted that the circuits of the apparatus are switched between the recording mode and the playback mode by a mode switching signal from a system controller 20. A key operating section 38 is connected to the system controller 20 and a particular operating mode is designated by an input operation at the key input operating section 38. The discriminating means 10a, 10b are used for making a discrimination as to whether the disc loaded into the recording and/or reproducing apparatus is or is not a magneto-optical disc, and a discriminating output is supplied to the system controller 20.

The 2-channel analog audio signals from an input terminal 21 are sampled at an A/D converter 22 at a sampling frequency of 44.1 kHz, and each sampled value is converted into a 16-bit digital signal. This 16-bit digital signal is supplied to a data compression/expansion circuit 23 operating as a data compression circuit during recording. In the present embodiment, input digital data are compressed at a ratio of $\frac{1}{4}$. There are a variety of data compression methods and, for example, an adaptive delta pulse code modulation (ADPCM) with a quantization bit number of 4, for example, may be employed. As another method, the input digital data are divided into a plurality of bands so that the band width will become broader towards a higher frequency range, a block composed of a plurality of samples is formed for each of the bands, with preferably the same number of samples from band to band, an orthogonal transform is performed for each of the bands to obtain coefficient data and bit allocation from block to block is performed on the basis of the coefficient data. High efficiency data compression may be achieved with this data compression method since it takes account of characteristics of the human auditory sense with respect to the sound.

Figure 7:
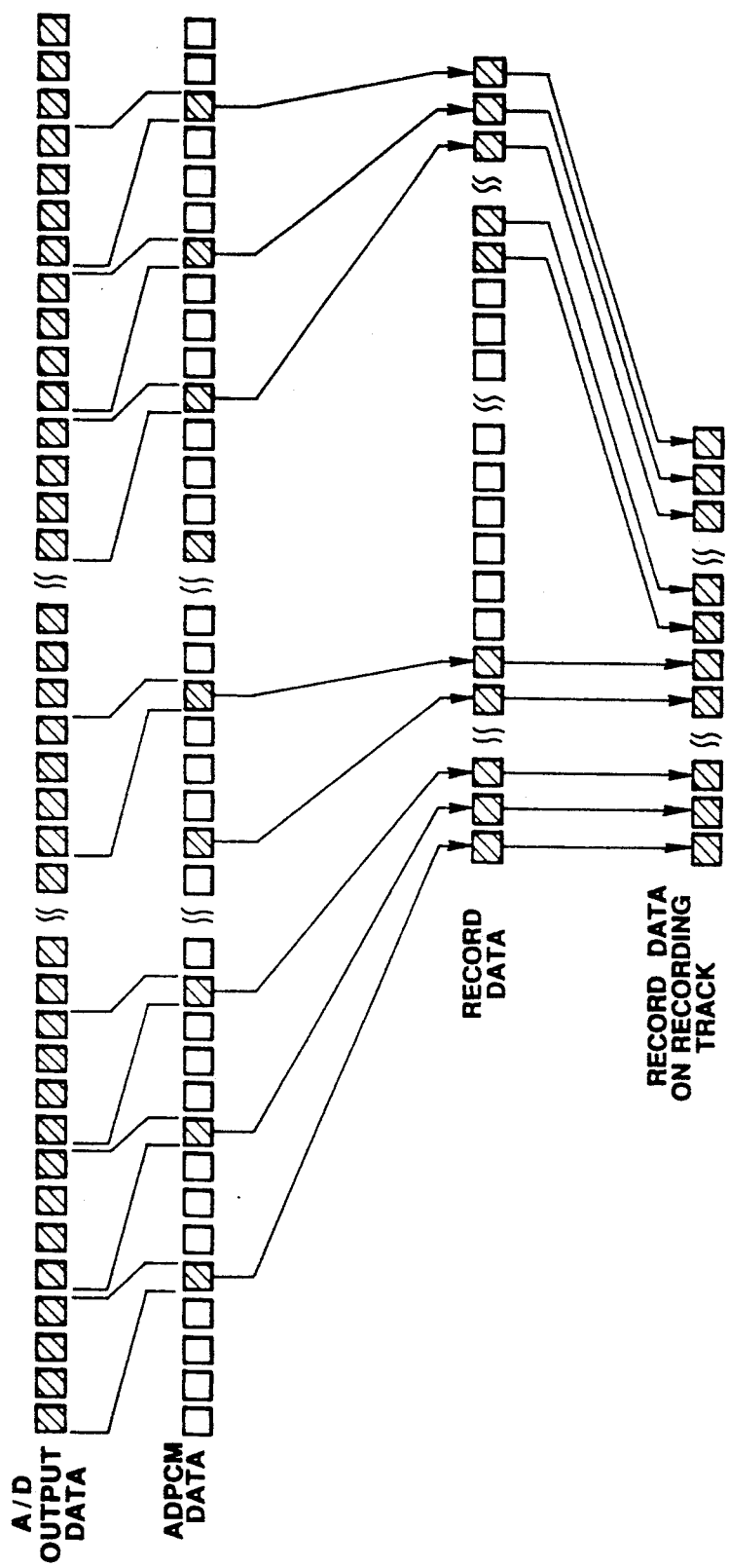
FIG. 7 is a timing chart for illustrating the recording operation of the disc recording and/or reproducing apparatus shown in FIG. 6.

In this manner, digital data DA from the A/D converter 22, shown in FIG. 7, are compressed at a ratio of $\frac{1}{4}$ by data compression at the data compression/expansion circuit 23, and compressed data da, are transferred to a buffer memory 25 controlled by a track jump memory controller 24. In the present embodiment, a D-RAM having a capacity of 1M bits is used as the buffer memory 25.

In the absence of a track jump, that is skipping of a recording position on the disc 1 due to vibrations or the like during recording, the memory controller 24 reads out the compressed data from the buffer memory at a transfer rate equal to four times the writing rate to transfer the read-out data to a data encode/decode circuit 26.

If a track jump is detected during recording, the memory controller 24 causes data transfer to the data encode/decode circuit 26 to be terminated, while causing the compressed data da from the data compression/expansion circuit 23 to be stored in the buffer memory 25. After the recording position has been corrected, the memory controller 24 causes data transfer to be re-initiated from the buffer memory 25 to the data encode/decode circuit 26.

For detecting if the track jump has occurred, a vibration meter V, for example, may be mounted on the apparatus to check if the magnitude of the vibrations is such as will produce a track jump. It is noted that, with the present disc 1, the absolute time code is recorded in superimposition on the wobbling signals for tracking control at the time of pregroove formation, as explained hereinabove. This absolute time code may be read from the pregroove during recording for detecting the track jump from the decoded output. Alternatively, the output of the vibration meter and the absolute time code may be taken for detecting the track jump. It is noted that the laser light power is to be lowered or reduced to zero on occurrence of a track jump.

Correction of the recording position on occurrence of a track jump may be performed by using the above mentioned absolute time code.

It will be seen from above that the storage capacity corresponding to the compressed data da corresponding to the time which elapses between the occurrence of a track jump until the end of the correction of the recording position is required as a minimum storage capacity of the buffer memory 25. It will be recalled that, in the present embodiment, the buffer memory 25 has a memory capacity of 1 Mbits, which memory capacity has been selected as having a sufficient tolerance to satisfy the above requirement.

In this case, the memory control to be performed by the memory controller 24 is such that as small a data volume as possible be stored in the buffer memory 25 during the normal recording operation. More specifically, the memory control is such that, when the data volume in the buffer memory 25 exceeds a predetermined data volume, a preset data volume is read out from the buffer memory 25 so that a writing space in excess of a prescribed data volume is maintained in the buffer memory.

The data encoding/decoding circuit 26 functions as an encoding circuit during recording for encoding the compressed data da transferred from the buffer memory 25 into data of a CD-ROM sector structure (about 2 Kbytes).

Output data from the data encoding/decoding circuit 26 are supplied to a recording encoding circuit 27 in which the output data are processed with encoding for error detection and correction, herein CIRC (cross interleave Reed Solomon code) encoding, as well as modulation suited for recording, herein EFM (eight to fourteen modulation).

Encoded output data from the recording encoding circuit 27 are supplied via a magnetic head driving circuit 28 to a magnetic head 29. The magnetic head driving circuit 28 actuates the magnetic head 29 so that a modulating magnetic field consistent with record data is applied to the disc 1 (magneto-optical disc) D in FIG. 6.

Although the disc 1 is accommodated in the cartridge proper 12, the shutter plate 13 is opened on loading the cartridge proper 12 into the recording and/or reproducing apparatus, so that the disc 1 is partially exposed via apertures 12a, 12b. A disc table provided at the distal end of a driving motor 3OM is intruded via the aperture 15 for rotationally driving the disc 1. It is noted that the disc driving motor 30M is controlled by a servo control circuit 32 as later described so that the disc is thereby driven rotationally at a linear velocity of 1.2 to 1.4 m/s.

Meanwhile, a magnetic plate, not shown is provided at the middle of the disc 1, while a magnet, also not shown, is provided on the disc table fitted on the output shaft of the motor 30M, so that the disc 1 is clamped to the disc table under a magnetic force of attraction between the magnet and the magnetic plate.

The magnetic head 29 faces the side of the disc 1 exposed via the aperture 12a of the cartridge proper 12. An optical head 30 is provided for facing the side of the disc 1 opposite to that faced by the magnetic head 29. The optical head 30 faces the magnetic head with the disc 1 in-between upon opening of the aperture 12b of the cartridge proper 12 caused by movement of the shutter plate 13. The optical head 30 is constituted by a laser light source, such as a laser diode, optical components, such as a collimator lens, an objective lens, a polarization beam splitter or a cylindrical lens, and a photodetector. During recording, a laser light of a constant laser power larger than that during reproduction is irradiated on the recording track. As a result of the light irradiation and the modulating magnetic field applied by the magnetic head 29, information signals or data are recorded on the disc 1 by inverting the direction of the magnetic domain of the optical magnetic recording film of the disc 1 in accordance with the external magnetic field applied to the disc 1 by the magnetic head 29.

The magnetic head 29 and the optical head 30 are interconnected by connecting means, not shown, so as to be transported in unison along the radius of the disc 1, by transport means, not shown.

During decoding, an output of the optical head 30 is supplied via an RF circuit 31 to an absolute time decoding circuit 34, whereby the absolute time code from the pregroove of the disc 1 is extracted and decoded. The decoded absolute time information is supplied to the recording encoding circuit 27 whereby an absolute time information is introduced into record data so as to be recorded on the disc. The absolute time information from the absolute time decoding circuit 34 is also supplied to the system controller 20 so as to be used for recognition of the recording position and position control, as mentioned previously.

With the above described recording and/or reproducing apparatus, it is possible to reproduce two types of discs, that is a reproduce-only optical disc and an overwrite type magneto-optical disc. These two types of the discs may be discriminated one from the other by detecting the discrimination holes 10a, 10b formed in the disc cartridge 2 or 12 on loading the disc cartridge into the apparatus, as explained previously. The two disc types may also be discriminated from the volume of the received light based on the different light reflection coefficients between the reproduce-only disc and the overwrite type disc. The disc discrimination output is supplied to the system controller 20 in a manner not shown.

The disc loaded on the recording and/or reproducing apparatus is rotationally driven by the disc driving motor 30M which is driven under control by a servo control circuit 32 so that the disc 1 is rotationally driven at a constant linear velocity of 1.2 to 1.4 m/s, in the same way as during recording.

The optical head 30 detects, during reproduction, the light irradiated on and reflected from a target track for detecting focusing errors by, for example, an astigmatic method, while detecting tracking errors by, for example, a pushpull method. If the disc is a reproduce-only optical disc, the optical head 30 detects reproduced signals by taking advantage of a phenomenon of light diffraction at the pit train of a target track, whereas, if the disc is an overwritable magneto-optical disc, the optical head 30 detects the reproduced signals based on the detected difference in the angle of light polarization, that is a Kerr rotation angle, of the reflected light from the target track.

The output of the optical head 30 is supplied to the RF circuit 31 which extracts the focusing error signals and the tracking error signals from the output of the optical head 30 to transmit the extracted signals to the servo control circuit 32, while processing the playback signals into corresponding binary signals, which are transmitted to a playback encoding circuit 33.

The servo control circuit 32 performs focusing control of the optical system of the optical head so that the focusing error signal will be reduced to zero, while performing tracking control of the optical system of the optical head 30 so that the tracking error signal will be reduced to zero.

On the other hand, the RF circuit 31 extracts the absolute time code from the pregroove to transmit the extracted signal to the absolute time decoding circuit 34. The absolute time information from the decoding circuit 34 is supplied to the system controller 20 so as to be used for controlling the playback position as the occasion may demand. The system controller 20 may also use a sector-by-sector address information extracted from the playback data for supervising the position on the recording track scanned by the optical head 30.

The playback decoding circuit 3 receives the binary playback signals from the RF circuit 31 to perform an operation which is complementary to the operation performed by the recording encoding circuit 27, that is the decoding for error detection and correction or eight-to-fourteen demodulation. Output data from the playback decoding circuit 33 are supplied to a data encoding/decoding circuit 26.

This data encoding/decoding circuit functions as a decoding circuit during reproduction for decoding the CD-ROM sector format data into the original compressed data.

Output data of the data encoding/decoding circuit 26 are transferred to the buffer memory 25 controlled by the track jump memory controller 24 so as to be written therein at a predetermined write rate.

If a track jump of skipping of the playback position due to vibrations or the like should occur during reproduction, the memory controller 24 reads out the compressed data from the data encoding/decoding circuit 26 sequentially at a transfer rate equal to one-fourth the write rate to transfer the read out data to the data compression/expansion circuit 23.

On detection of a track jump during reproduction, the memory controller 24 terminates data writing from the circuit 26 to the buffer memory 25 and only performs an operation of transferring data to the data compression/expansion circuit 23. When the playback position has been corrected, the memory controller 24 performs a control of re-starting data writing from the circuit 26 to the buffer memory 26.

Detection of whether a track jump has occurred may be achieved in the same way as during recording, that is, by using a vibration meter, by using the absolute time code recorded in the pregroove of the optical disc in superimposition on the wobbling signals for tracking control, that is by using a decoded output of the absolute time decoding circuit 34, or taking an OR of the output of the vibration meter and the absolute time code. Alternatively, the absolute time information and the sector-by-sector address information, extracted from the playback data during reproduction as mentioned previously, may also be used for track jump detection.

Meanwhile, track position control, such as playback position correction, on occurrence of the track jump, may also be achieved by using the above mentioned address information, in addition to using the absolute time code, as mentioned previously.

It will be seen from above that the buffer memory 25 is of such a minimum capacity for reproduction that data corresponding to the time which elapses since occurrence of track jump until correction of the playback position be stored therein at all times, inasmuch as it becomes possible with such data capacity of the buffer memory to continue data transfer from the buffer memory 25 to the data compression/expansion circuit 23 despite the occurrence of a track jump. The memory capacity of 1 Mbits of the buffer memory 25 of the present embodiment is selected as being a capacity having a sufficient allowance to satisfy the above requirement.

It is to be noted that the optical disc according to the present invention is not limited to the reproduce-only optical disc or an overwritable optical disc, but may also be a write once optical disc.

The overwritable optical disc may also be a phase-transition type optical disc taking advantage of crystal to amorphous phase transitions.

As the information recorded on the disc, video signals, pattern signals such as letter or figure signals, code conversion signals or map information, may also be recorded, in addition to the audio signals.

What is claimed is:

1. A recording apparatus for a disc-shaped recording medium which has a disc-shaped transparent base plate, a recording layer provided on said base plate and a protective layer provided on said recording layer, wherein the base plate has a diameter not larger than 64 mm and an address information is previously recorded on said disc-shaped recording medium as a wobbled groove, a recording track is formed according to said wobbled groove at a track pitch of approximately 1.6 $\mu$m, and the track has an information recording capacity of not less than 130 Mbytes, said recording apparatus comprising:

a rotational driving means for detecting a signal from the wobbled groove and rotationally driving the disc-shaped recording medium at a constant linear velocity in accordance with the signal detected from the wobbled groove;

data compression means for data-compressing an input digital information;

recording encoding means for processing compressed data from said data compression means by error correction encoding and predetermined modulation;

recording means, including a recording head, for recording encoded data from said recording encoding means on said disc-shaped recording medium while rotating the recording medium at a constant linear velocity by said rotational driving means;

means for detecting a track jump by the recording means due to vibration and for resetting the recording means to a correct track position after the occurrence of the track jump;

a buffer memory provided between said data compression means and said recording encoding means, said buffer memory having at least a data capacity capable of storing data from said data compression means corresponding to a recording time which elapses between an occurrence of a track jump of a position of said recording means on said disc-shaped recording medium and a resetting of the recording head to a correct track position; and wherein the means for detecting a track jump further includes buffer memory control means for causing data to be read out of the buffer memory during periods when no track jump is detected so as to always maintain a writing space in the buffer memory which is in excess of a predetermined data volume.

2. A recording apparatus for a disc-shaped recording medium as claimed in claim 1 wherein said means for detecting a track jump comprises vibration detecting means for detecting whether a track jump has occurred during a recording operation and the buffer memory control means terminates the supply of the compressed data from said data compression means to said recording encoding means and for supplying the compressed data from said data compression means to said buffer memory when a detection output from said vibration detecting means indicates an occurrence of a track jump during the recording operation.

3. A recording apparatus as claimed in claim 1 wherein said buffer memory is controlled by the buffer memory control means so that data stored in said buffer memory are read out at a rate which is consistent with the data compression rate by said data compression means and which is higher than the data writing rate by said data compression means into said buffer memory.

4. A reproducing apparatus for a disc-shaped recording medium which has a disc-shaped transparent base plate, a recording layer provided on said base plate and a protective layer provided on said recording layer, wherein the base plate has a diameter not larger than 64 mm and an address information is previously recorded on said disc-shaped recording medium as a wobbled groove, a recording track is formed according to said wobbled groove at a track pitch of approximately 1.6 µm, and the track has an information recording capacity of not less than 130 Mbytes, said reproducing apparatus comprising:

rotational driving means for rotationally driving the disc-shaped recording medium at a constant linear velocity;

an optical head for reading compressed data from said disc-shaped recording medium rotated at a constant linear velocity and producing an output signal;

an RF circuit for detecting playback signals from an output of said optical head;

playback decoding means for processing said playback signals from said RF circuit by error correction decoding and by demodulation complementary to modulation performed during recording;

data expansion means for expanding compressed data from said playback decoding means;

track jump detecting means supplied with the output signal from the optical head for detecting a signal from the wobbled track, detecting a track jump due to vibration from the signal from the wobbled track, and resetting said optical head to a correct track position after the occurrence of a track jump; and a buffer memory provided between said playback decoding means and said data expansion means, said buffer memory having a capacity at least sufficient to supply data to said data expansion means corresponding to a playback time which elapses between the occurrence of a track jump of a playback position on said disc-shaped recording medium and a resetting of said playback position of the optical head to a correct track position.

5. A reproducing apparatus for a disc-shaped recording medium as claimed in claim 4 wherein said track jump detecting means comprises vibration detecting means for detecting whether a track jump has occurred during a reproducing operation and controlling means for terminating the writing of the data from said playback decoding means to said buffer memory and for only transferring data to said expansion means when a detection output from said vibration detecting means indicates an occurrence of a track jump during the reproducing operation.

6. A recording and/or reproducing apparatus for a disc-shaped recording medium which has a disc-shaped transparent base plate, a recording layer provided on said base plate and a protective layer provided on said recording layer, wherein the base plate has a diameter not larger than 64 mm and an address information is previously recorded on said disc-shaped recording medium as a wobbled groove, a recording track is formed according to said wobbled groove at a track pitch of approximately 1.6 µm, and the track has an information recording capacity of not less than 130 Mbytes, the recording and/or reproducing apparatus comprising:

rotational driving means for detecting a signal from the wobbled groove and rotationally driving the disc-shaped recording medium at a constant linear velocity in accordance with the signal detected from the wobbled groove;

data compression means for data-compressing an input digital information;

recording encoding means for processing compressed data from said data compression means by error correction encoding and predetermined modulation;

recording/reproducing means for recording and reproducing encoded data from said recording encoding means on said disc-shaped recording medium while said disc-shaped recording medium is being rotated by the rotational driving means at a constant linear velocity, the recording/reproducing means including an optical head and means for generating an external magnetic field, the optical head and the means for generating an external magnetic field being positioned to face each other with said disc-shaped recording medium in-between;

an RF circuit for detecting playback signals from an output signal of said optical head;

playback decoding means for processing said playback signals from said RF circuit by error correction decoding and by demodulation complementary to modulation performed during recording;

data expansion means for expanding the compressed data from said playback decoding means;

track jump detecting means supplied with the output signal from the optical head for detecting a signal from the wobbled track, detecting a track jump due to vibration from the signal from the wobbled track, and resetting said optical head and the means for generating an external magnetic field to a correct track position after the occurrence of a track jump; and a buffer memory provided between said data compression means and said recording encoding means and between said playback decoding means and said data expansion means, said buffer memory having a capacity at least sufficient during recording to store data from said data compression means corresponding to a recording time which elapses between an occurrence of a track jump of a position of said recording means on said disc-shaped recording medium and a resetting of the optical head and the means for generating an external magnetic field to a correct track position, and during reproducing to supply data to said data expansion means corresponding to a playback time which elapses between the occurrence of a track jump of a playback position on said disc-shaped recording medium and a resetting of said playback position of the optical head to a correct track position.

7. A recording and/or reproducing apparatus for a disc-shaped recording medium according to claim 6 wherein the track jump detecting means includes vibration detecting means for detecting whether a track jump has occurred during a recording operation or a reproducing operation, and controlling means for terminating supply of the compressed data from said data compression means to said recording encoding means and supplying the compressed data from said data compression means to said buffer memory when a detection output from said vibration detecting means indicates an occurrence of a track jump during a recording operation of recording information signals on said recording medium by said optical head and said means for generating an external magnetic field, and for controlling the operation of said buffer memory for terminating the writing of data from said playback decoding means to said buffer memory and only transferring data to said expansion means when the detection output from said vibration detecting means indicates an occurrence of a track jump during a reproducing operation by said optical head.

* * * * *